(12) United States Patent
Gygax

(10) Patent No.: US 8,210,466 B2
(45) Date of Patent: Jul. 3, 2012

(54) LIGHT PLANE IN THE ULTRALIGHT CATEGORY AND SPORT PLANE CATEGORY

(75) Inventor: Hans Gygax, Munchenstein (DE)

(73) Assignee: Light Wing AG, Stans (CH)

( * ) Notice: Subject to any disclaimer, the term of this patent is extended or adjusted under 35 U.S.C. 154(b) by 830 days.

(21) Appl. No.: 10/554,309

(22) PCT Filed: Apr. 13, 2004

(86) PCT No.: PCT/CH2004/000224
§ 371 (c)(1),
(2), (4) Date: Aug. 28, 2006

(87) PCT Pub. No.: WO2004/094228
PCT Pub. Date: Nov. 4, 2004

(65) Prior Publication Data
US 2009/0014585 A1  Jan. 15, 2009

(30) Foreign Application Priority Data
Apr. 22, 2003 (CH) .................................... 715/2003

(51) Int. Cl.
*B64C 1/00* (2006.01)
(52) U.S. Cl. ....................................... 244/13; 244/118.5
(58) Field of Classification Search .................. 244/119, 244/900, 135 R, 118.5, 117 R, 13
See application file for complete search history.

(56) References Cited

U.S. PATENT DOCUMENTS

| | | | | |
|---|---|---|---|---|
| 1,444,058 A * | 2/1923 | Boyd | .......................... | 244/117 R |
| 2,132,529 A * | 10/1938 | Firner | ........................... | 244/119 |
| 2,183,323 A * | 12/1939 | Moss | ............................. | 244/119 |
| 2,553,207 A | 5/1951 | Peltier, Jr. | | |
| 4,483,499 A * | 11/1984 | Fronk | .......................... | 244/118.1 |
| 4,637,575 A * | 1/1987 | Yenzer | ......................... | 244/118.5 |
| 4,706,907 A * | 11/1987 | Kopylov | .......................... | 244/49 |
| 4,783,025 A * | 11/1988 | Moffett | ........................ | 244/118.5 |
| 5,490,703 A * | 2/1996 | Hewko | ............................. | 296/19 |
| 5,779,296 A * | 7/1998 | Hewko | ............................. | 296/19 |
| 5,785,277 A * | 7/1998 | Manning et al. | ........... | 244/137.2 |
| 5,961,071 A | 10/1999 | Proctor | | |
| 6,585,188 B2 * | 7/2003 | Alli | ............................ | 244/118.5 |

FOREIGN PATENT DOCUMENTS

GB   2 280 882 A   2/1995

OTHER PUBLICATIONS http://web.archive.org/web/20031220184456/http://www.comco-ikarus.de/ (2003).*
International Search Report, WO 2004/094228 A1.

* cited by examiner

*Primary Examiner* — Joshua J Michener
*Assistant Examiner* — Brian M O'Hara
(74) *Attorney, Agent, or Firm* — Calfee, Halter & Griswold LLP

(57) ABSTRACT

This light aeroplane at the same time fulfilled the weight limits for the European ultra light class or acolyte class as do at the same time for the US-American sport plan Category. It comprises an engine arranged at the nose and is provided with tractor airscrew and the cabin cell that is arranged behind the engine and is wide enough for two adjacent passenger seats. A central tube (1) with a 200 mm diameter extends forwards towards the engine and to the rear at least behind the front edge of the lateral rudder and elevator control. Everything else is constructed around said tube. A square profiled element (12) is transversally guided edgeways beneath the central tube (1) and is rigidly connected to the same in a positively engaged manner. An upwardly projecting tube bend (11), which arches over the length of the square profiled element is fixed to the rear side of the square profiled element (12) with the ends thereof. The level of a virtual plane cabin floor is defined above the square profile (12). The free space above said floor is orthorhombic: at least 190 cm long, at least 45 cm wide and at least 40 cm high.

9 Claims, 10 Drawing Sheets

LIGHT PLANE IN THE ULTRALIGHT CATEGORY AND SPORT PLANE CATEGORY

RELATED APPLICATIONS

Figure 1:
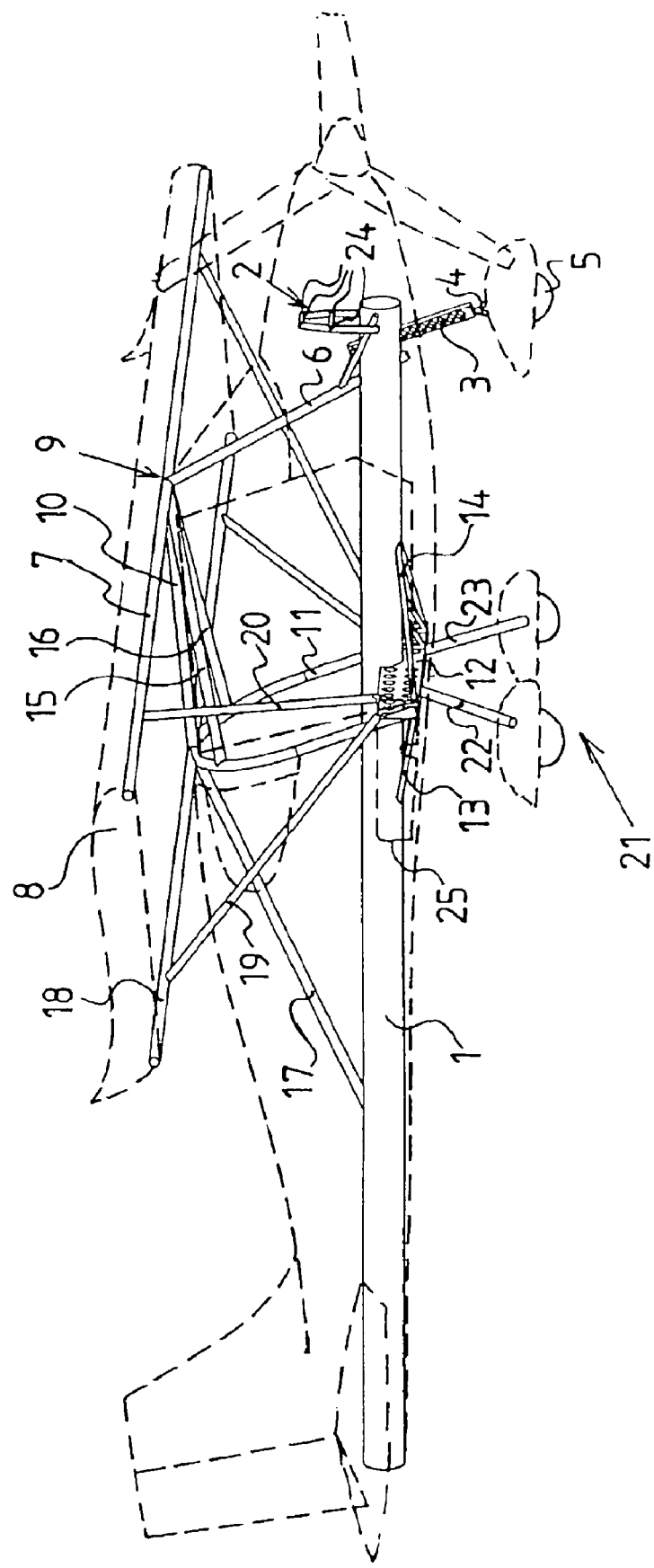

This application is a national stage application based on International Application No. PCT/CH2004/000224, filed Apr. 13, 2004, which claims priority from Switzerland application No. 715/03 filed Apr. 22, 2003. This application claims the benefit of both said prior applications. This application incorporated by reference the entire disclosures of both said applications.

This invention concerns a light aeroplane of the ultralight-class and sport plan Category, which means with a maximum take-off weight (Maximal Take-Off Weight MTOW) of 472.5 kg in Europe and 590 kg in the U.S.A. In Europe hitherto applied for ultralight aeroplanes, which also are denominated as ecolight aeroplanes, have a maximum take-off weight of 450 kg. However, shortly this take-off weight, that means from 1. January 2004 at least in Germany and with a high probability also in Switzerland, will be elevated to 472.5 kg, in the case of a maximum allowed dry weight of the airplane of 297 kg. In the U.S.A. a new aeroplane category has already been introduced, in fact the so-called sport plane Category SPC. An aeroplane of this category may have a maximum dry weight of 350 kg and a maximum take-off weight MTOW of 590 kg.

The ultralight or ecolight aeroplane presented here is designed using a conventional construction, that means with a piston engine arranged at the nose with tractor propellers and cabin cell arranged behind, with a main wing for the uplift and a stern wing as elevator assembly for the production of a take-off, as well as a vertical stabilizer, respectively a rudder between and above the elevator assembly. The body extends between the engine and the stern wing.

Ultralight or ecolight aeroplanes with this basic construction are already known. In case of the construction of each ultralight aeroplane, the observance of the legal limit weight is a very important matter in all respects. When two people, each with 80 kg body weight must be taken into the air and moreover an acceptable carrying distance must be ensured by taking along approximately 20 liters of fuel, the additional load already amounts to 2×80 kg=160 kg+approximately 20 kg fuel=approximately 180 kg, thus non-refueled aeroplanes, namely aeroplanes not carrying fuel, hitherto were only allowed to weigh 270 kg, that was maintainable only under exhaustion of a consistent lightweight construction. Many ULs (Ultralights) have a dry weight of about 290 kg or even some kg more and as a consequence of this they are flown, when occupied by two people, almost permanently with a weight surplus of 20 kg or more, which hitherto was simply accepted by the legislator in many places due to a lack of consistent checks. This is not a problem for flying itself in terms of the technical side, however there are more serious insurance and legal consequences when the case involves an accident due to a weight surplus. Normal data are now also taken into account because of a rise of the maximum take-off weight of 22.5 kg from 450 kg to 472.5 kg and the take-off weights frequently produced are subsequently sanctioned and legalized for the future.

With the ultralight aeroplane IKARUS C42, a two-seated aeroplane is already known which was designed by the same aeroplane designer as the developer and constructor of the present ultralight-aeroplane, and which did set new standards with respect to weight, acquisition costs and fuel consumption when it first appeared. This aeroplane IKARUS C42 was already sold approximately 600 times in the many different countries and presents as a particularity a central bearer tube consisting of s less drawn aluminium, which of a seamless drawn aluminium, which extends from the motor to the elevator assembly and on which—directly or indirectly—all the further parts are annexed. This central tube gives the aeroplane an exceedingly light and stable chassis, which can absorb considerable flexural and twist forces. In front of this central tube the piston engine is annexed with the propeller, then the passenger cell as a tube-grate frame consisting of aluminium tubes, on the lower side the complete landing gear with nose-wheel, then the main wing as high-wing monoplane wing with its V-shaped bracings and finally at the back end of the tube the elevator assembly and vertical stabilizer. The control means are executed as an articulated linkage in the form of rotatable push rods and tie rods, which are housed and guided along the central tube. The outside covering of the aeroplane, thus its being body visible from the outside including the motor cladding and the doors mounted on both sides of the passenger cell consists of synthetic panels reinforced with carbon fibres, that must not carry out any basic functions, but must serve exclusively and solely for the encapsulation of the passengers in a cabin and for maintenance of the aerodynamics, and as side effect naturally it must also determine the aesthetic appearance of the aeroplane. The motor for the IKARUS C42 is a four stroke Rotax 912 UL with a power of 58 kW. With two people, a rising power of 5 m/s and a flight speed of 175 km/h at a power of 75% can be obtained. Thanks to its ingenious construction this aeroplane only weighs dry 260 kg. With two occupants, each with a weight of 80 kg, in accordance to the previous weight rule 30 kg additional load capacity for fuel was permitted and in accordance with the new rule it can be up to 52.5 kg. In the case of fuel consumption of 10-12 liters per hour (L/H) a respectable theoretic distance range of approximately 430 km to 525 km is possible under the observance of the old limit weight of 450 kg, however this distance increases with the new weight limit of 472.5 kg from 750 km to 920 km.

The cabins of conventional ultralight or ecolight aeroplanes and also that of the IKARUS C42 are often designed relatively closely, in order to maintain at a minimum the air resistance and also the weight. An UL however would be an excellent work aeroplane due to its small acquisition and keeping costs and its low noise development, nominally for patient transports, but also for other tasks, such as for the haulage of gliders, for supervisory and control tasks, such as coastal and border supervision etc., for traffic control, for police search tasks or for air surveillance of large events causing traffic congestion and also photograph flights and scientific measuring flights. In many countries hitherto pipelines and high-voltage lines are controlled wirelessly by helicopters. If an ultralight aeroplane offered more cargo space, many tasks which up until now required helicopters that have very expensive keeping costs or substantially larger and more expensive aeroplanes could be carried out by ultralight aeroplanes that both with respect to the acquisition costs particularly in relation to the operation costs are much more economical.

The struggle against surplus weight hitherto prevented the construction of larger passenger cells or respectively cargo compartments or never allowed this type of development by the constructors. Constructors always rather tried to build a small and correspondingly light passenger cell using an optimal form so that two people could just fit comfortably.

At present there is no ultralight or ecolight aeroplane which comprises such a large cabin, so that for example a patient could be transported in a lying position, although a patient in a lying position weighs no more than a person in a sitting position. For this purpose, for weight reasons the cabins are have excessively small dimensions, both in terms of their width and even more so with respect to their length. Also the futuristic IKARUS C42 has a passenger cell that is essentially too short to transport in it a person lying down. A larger storage space however would be required not only for patient transport, but also for other different single applications of an aeroplane economically operable in such a way. When two people wish to take a journey of several days with an ultralight aeroplane, there is hardly place in the filmier constructions to accommodate their baggage, even if the carrying of this luggage would be possible without problems for weight reasons. Often storage space is requested for a two-man tent, for fishing or hunting equipment, for cooking apparatuses, for provisions and the like. In case of the known ultralight aeroplanes the space for such things is insufficient. A larger space in the cabin would also be necessary for measuring and photograph flights to accommodate the different device apparatus.

Therefore, it is the aim of the present invention to create an aeroplane of the ultralight class and sport plan Category, that means with a maximum take-off weight (Maximal Take-Off Weight MTOW) according to regulation of 472.5 kg to 590 kg, which comprises a much more spacious cabin, so that as a minimum requirement at least one adult person in a lying position on stretcher can be transported.

This aim is resolved by a Light aeroplane of the ultra light class and sport plane category, that means with an admitted maximum take-off weight (Maximally Take-off Weight MTOW) each of 452.5 kg to 590 kg according to respective regulations, comprising an engine arranged at the nose with tractor propellers and cabin cell arranged behind and being wide enough for two adjacent passenger seats, comprising a virtual flat cabin floor which does leave free an orthorhombic space over this virtual floor of at least 190 cm in length, at least 45 cm wide and at least 40 cm in height, whereby this space allows the reception of a person lying on a stretcher for airtransporting of said person.

Figure 2:
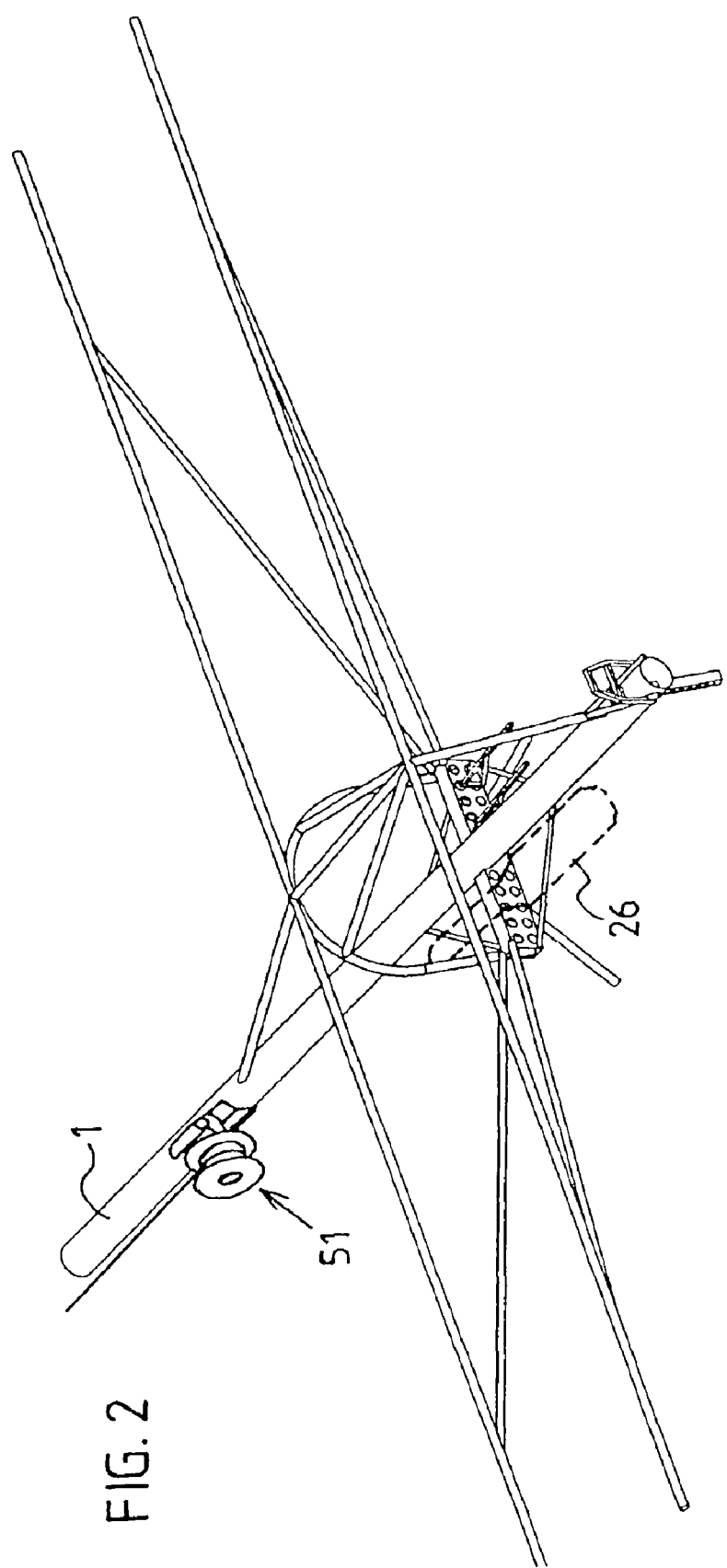
Figure 3:
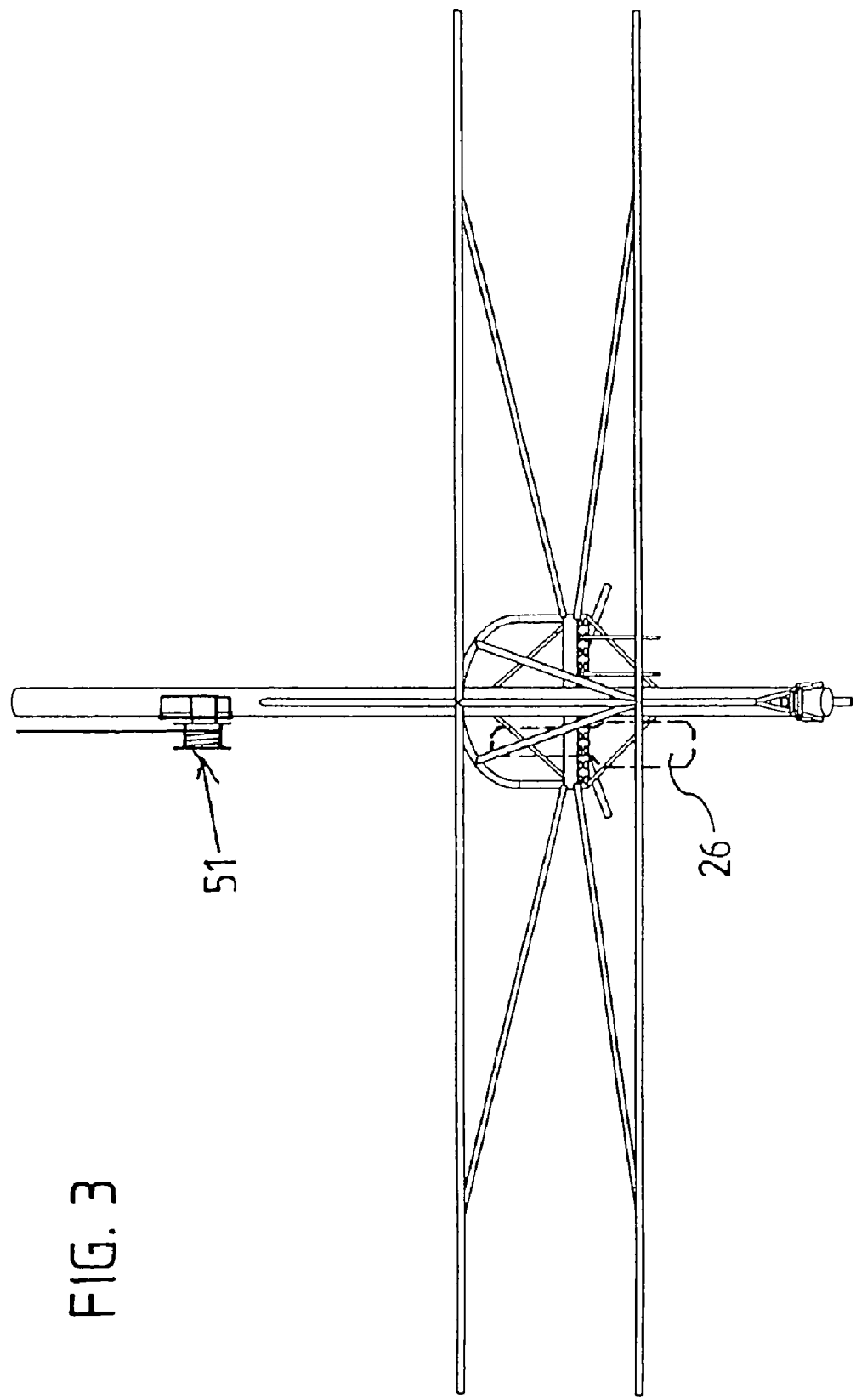
Figure 4:
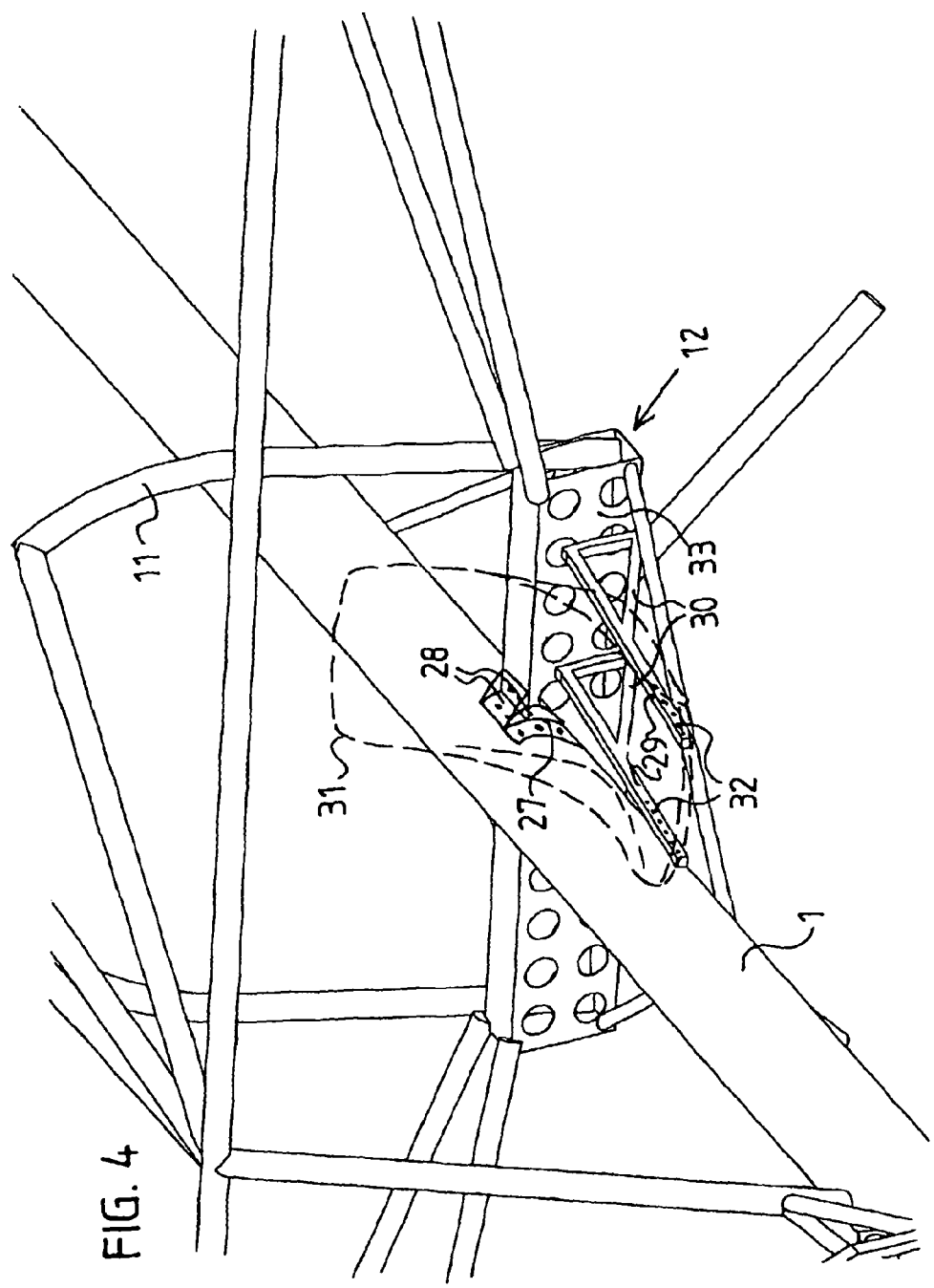

It shows:

FIG. 1: The chassis construction of the aeroplane seen from the side, in which the outlines of cell, body and wings are drafted in lines;

FIG. 2: The chassis construction seen obliquely in front and above;

FIG. 3: The chassis construction seen in front and above;

FIG. 4: A section of the chassis construction with the transversely incorporated square profile and the seat mount.

Figure 5:
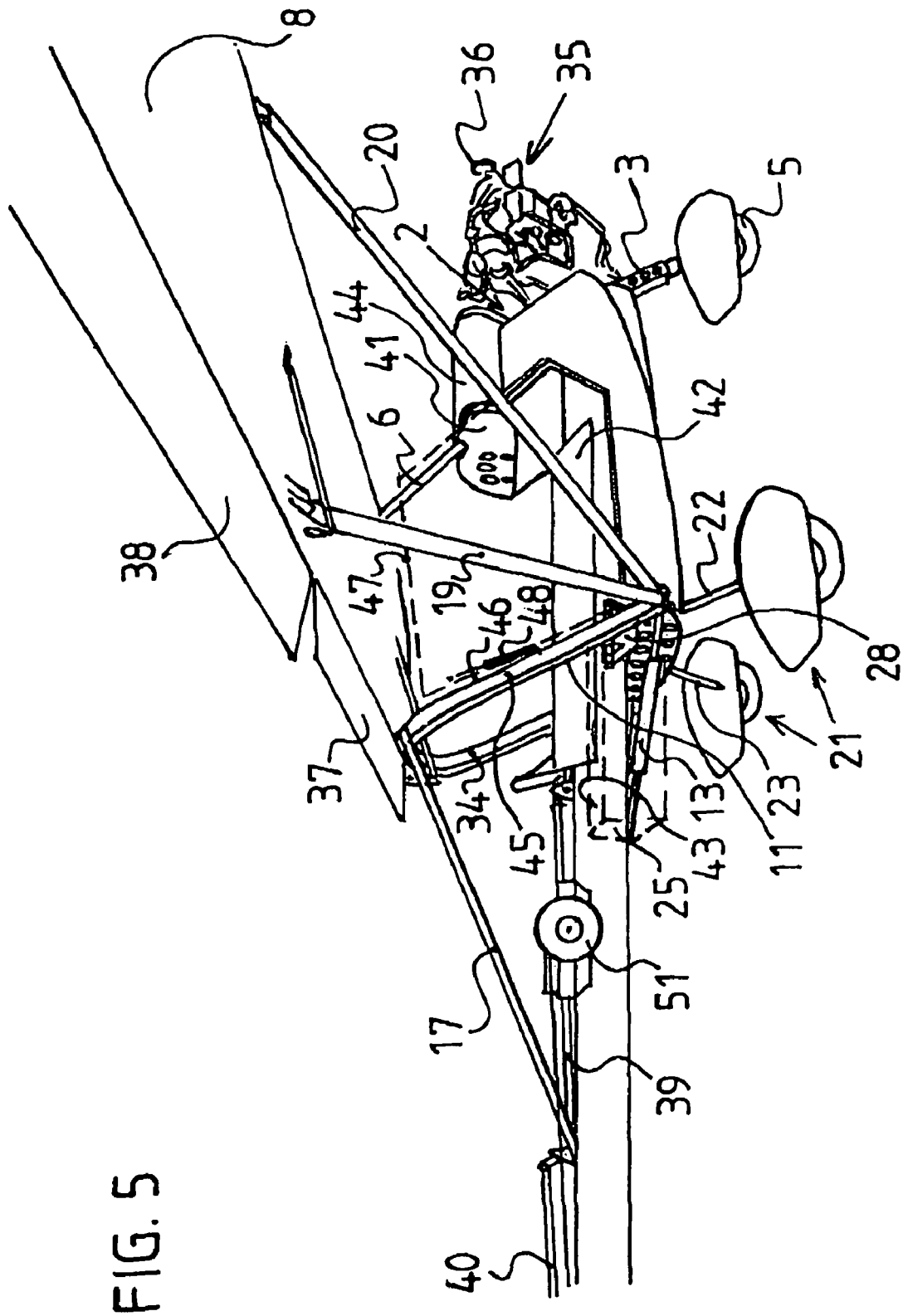
Figure 6:
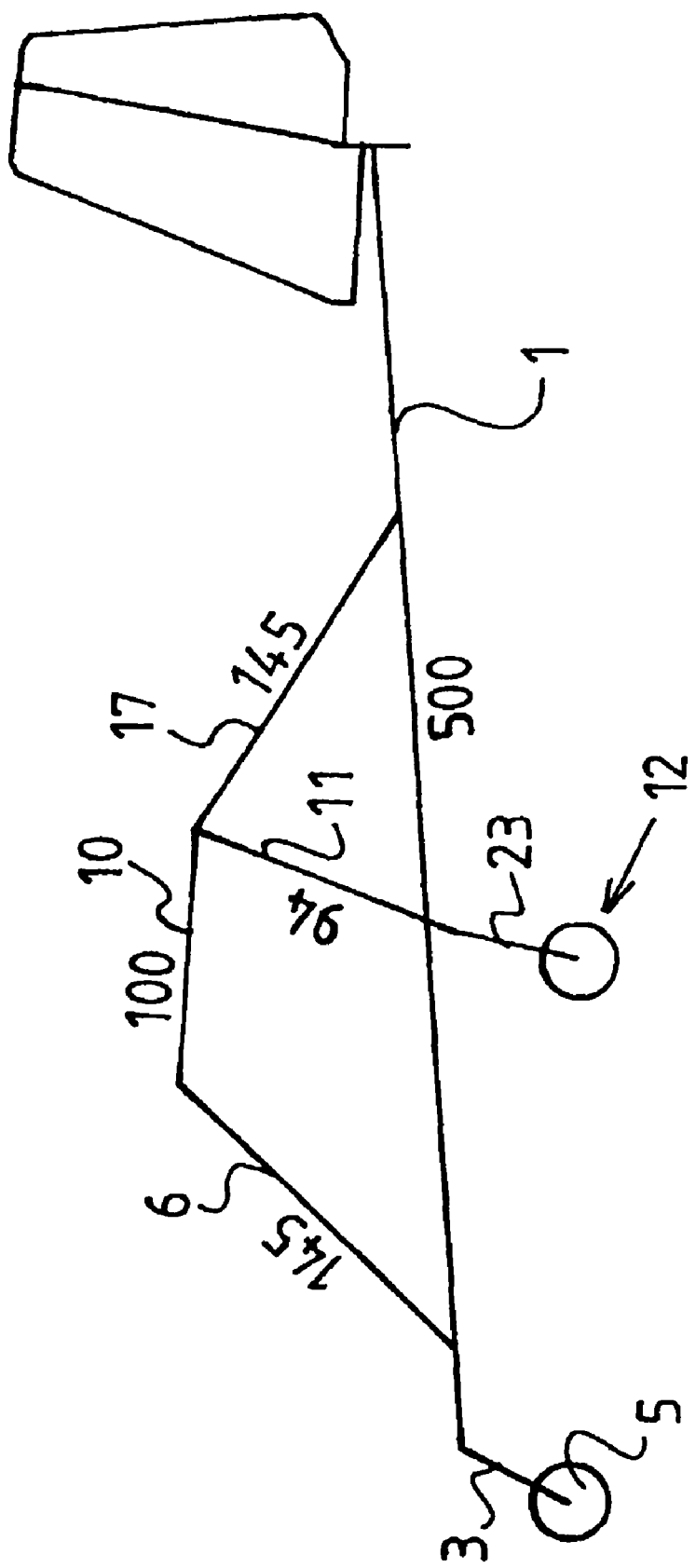
Figure 7:
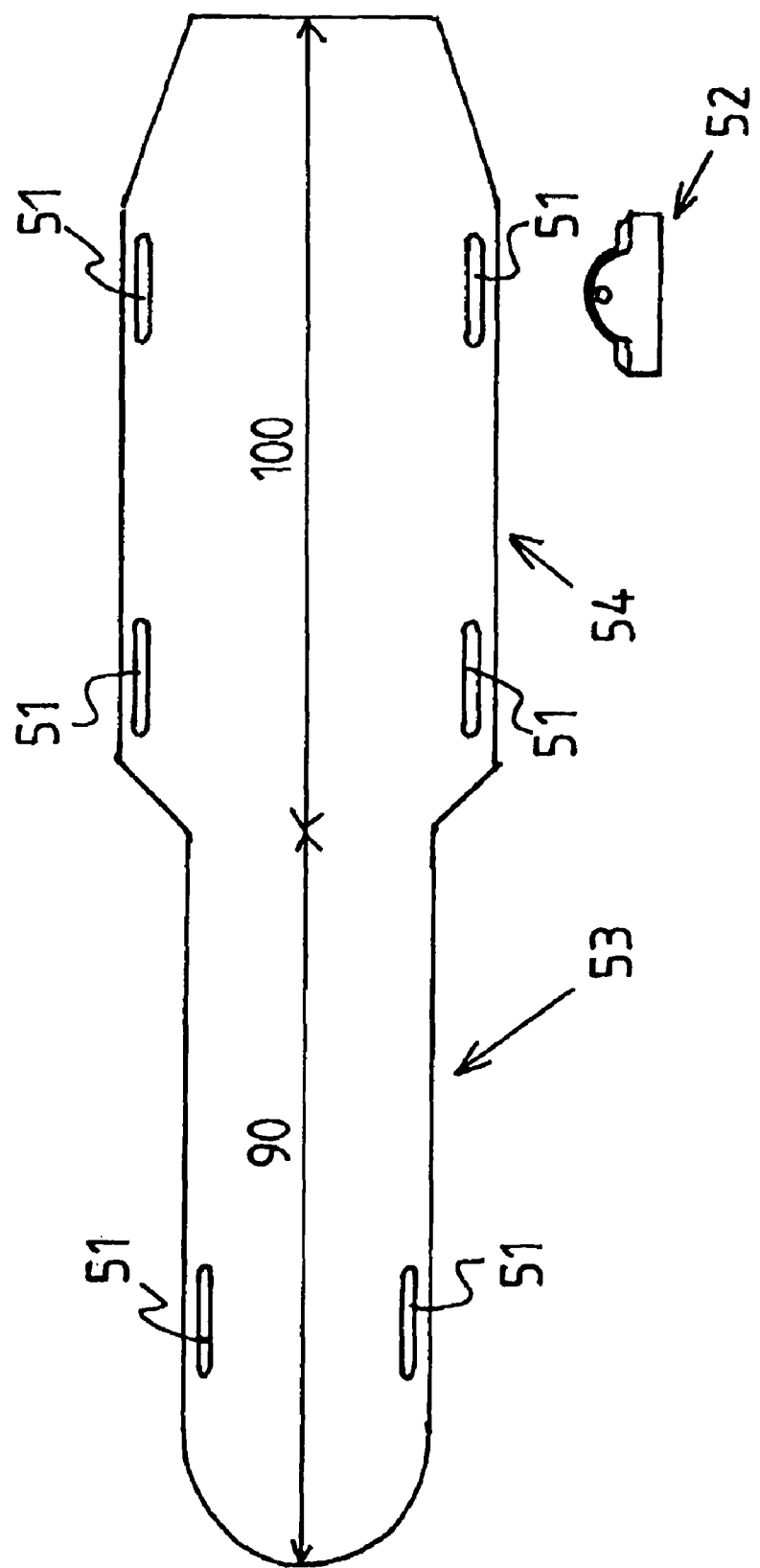
Figure 8:
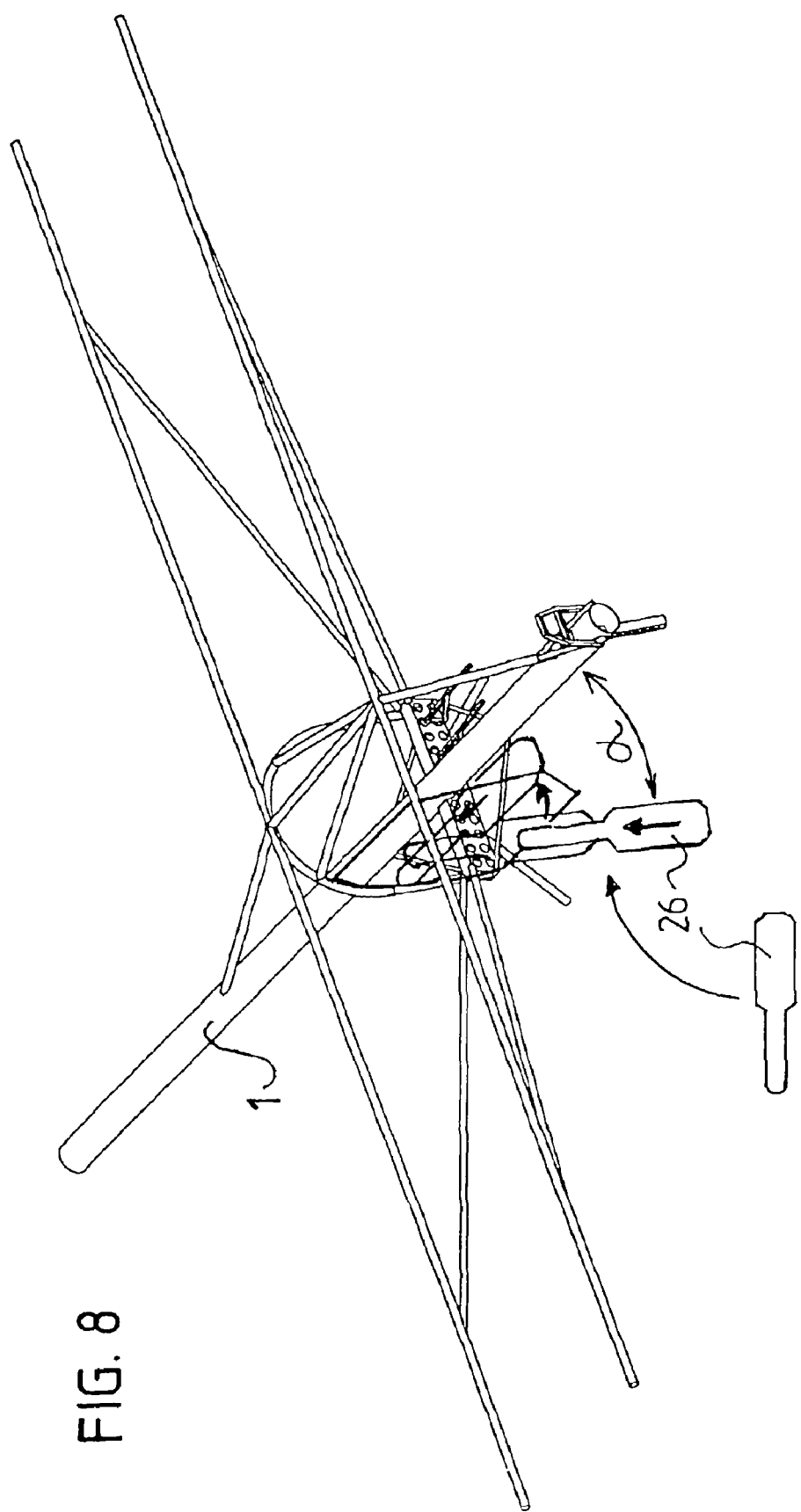
Figure 9:
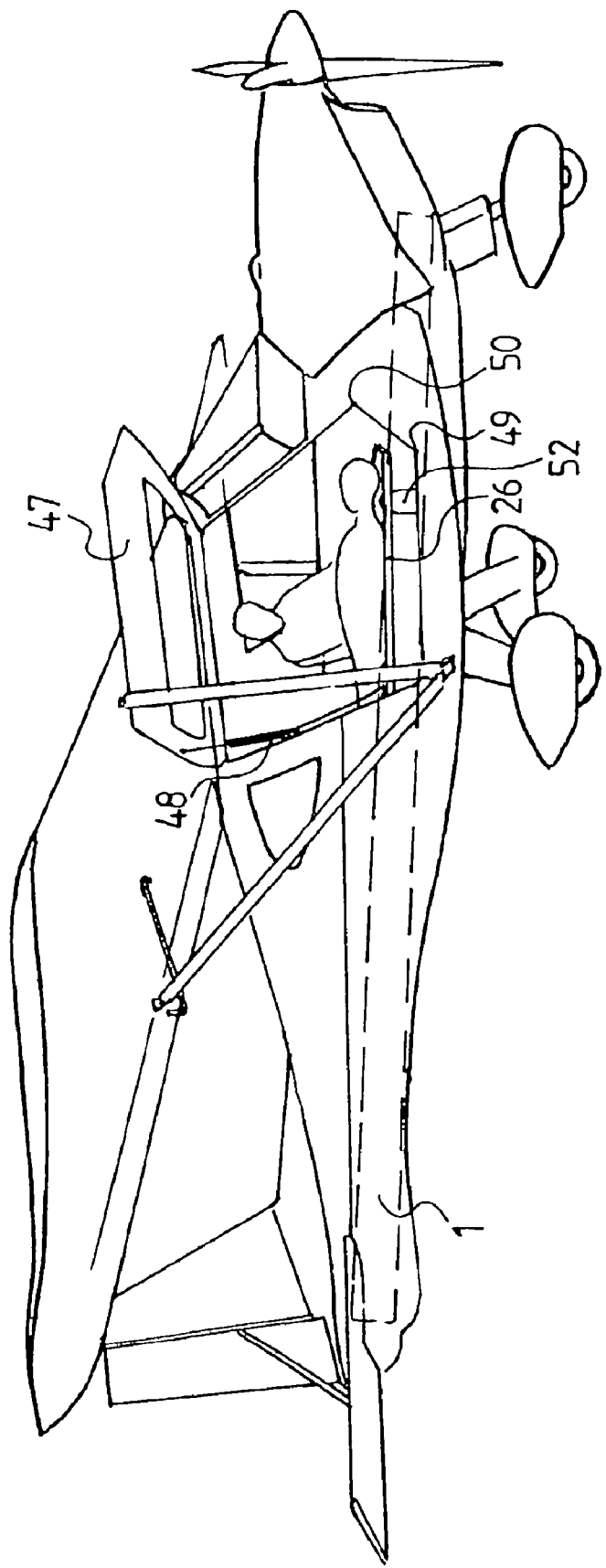
Figure 10:
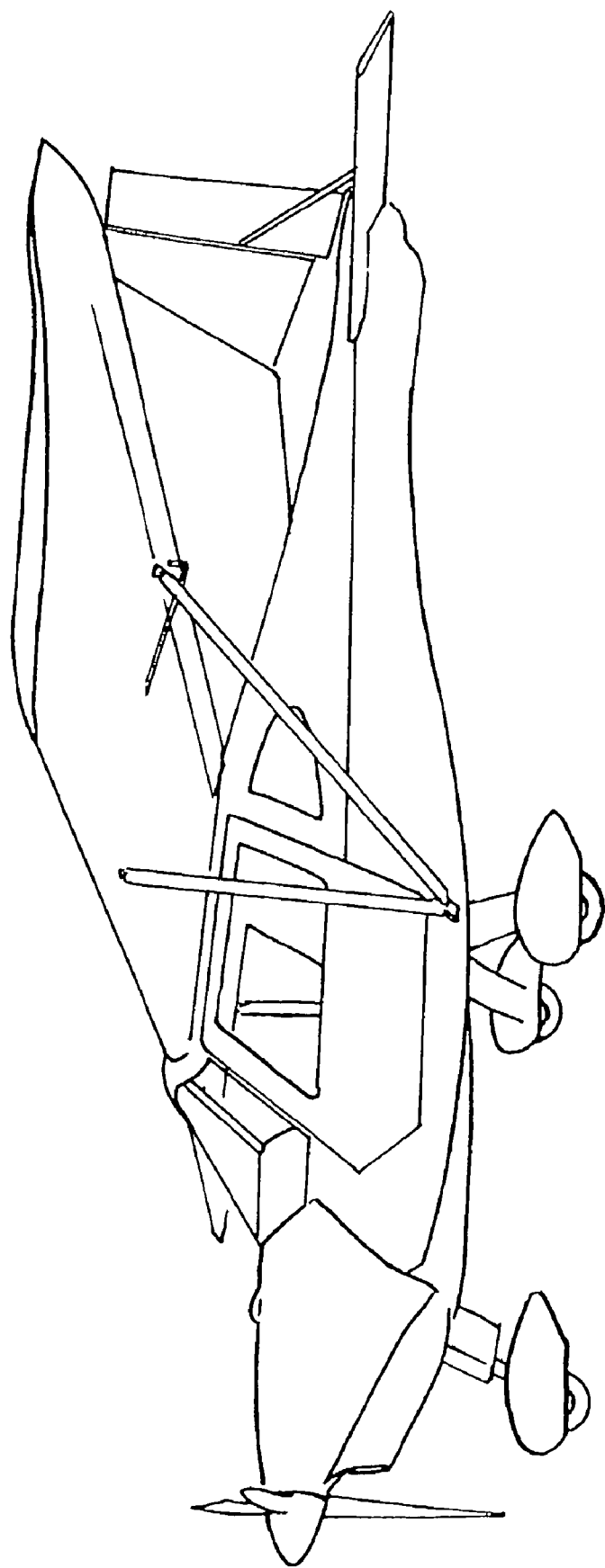

FIG. 5: The chassis construction with engine, dashboard, landing gear and suggested wing seen obliquely behind;

FIG. 6: The aeroplane concept according to FIG. 5 with its main construction measures and angles;

FIG. 7: A special stretcher that can be introduced into the cabin and can be attached in said cabin for carrying patients who are in the lying position;

FIG. 8: The movement of a special stretcher during the loading of patient into the aeroplane cabin represented in several snapshots;

FIG. 9: The total aeroplane seen from its right side, with the door opened and a patient inside in a lying position;

FIG. 10: The total aeroplane seen from its left side.

In FIG. 1 the general construction type of this aeroplane is represented through a perspective view. The substantial feature is the central tube 1, which extends almost beyond the whole aeroplane length. In the example shown, it concerns a seamless drawn aluminium tube with an external diameter of 200 mm and 1.8 mm wall strength. To this central tube 1 are annexed and braced all the further components of the aeroplane. Beginning at the front one notes that above on the front end zone of the central tube 1 the motor mount 2 is disposed. Slightly behind it a laterally perforated square profiled tube 3 traverses the central tube 1 from the bottom slightly obliquely backward inclined. In this square profiled tube 3 a shock strut is housed, which carries at the bottom a wheel fork 4, in which the front wheel 5 of the landing gear is stored. Further behind, the central tube 1 is traversed by an oblique backward tilted aluminium tube 6, which extends in a vertical level along the centre of the central tube 1. This tube 6 runs in a transverse tube 7, which marks the front edge of the carrying wing 8. From this opening point 9 extends a central apex tube 10 until the apex of a tube bend 11 that is arranged tilted backward slightly. At the lower ends of this tube bend 11 an aluminium square profile 12 is arranged crosswise to the central tube 1 and extends under this central tube 1 through. The ends of the tube bend 11 are screwed with mount elements at the rear sides of this square profile 12. The square profile 12 extends beyond the whole width of the cabin and thus measures approximately 120 cm in length. Both its sides are perforated or provided with similar material recesses, in order to save weight, and its lower sides are braced behind and in front with tube struts 13, 14 obliquely to the central tube 1. Overall, where bracing elements lead next to or through the central tube 1, these are strongly screwed with angle elements with the central tube 1. Also the square profile 12 is screwed by means of suitable fixing elements with the central tube 1, so that it constitutes a rigid cross in any direction. Directly behind the square profile 12 and lying on the backward leading struts 13, the box-shaped fuel tank 25 consisting of carbon fibres reinforced plastic is placed. This fuel tank 25 presents above a half cylindrical consolidation for the central tube 1 and at the bottom obliquely extending recesses, with which it rests exactly fitted on the struts 13. For its production, carbon fibre reinforced plastic-mats are inserted under warm deformation into a negative form for the outer walls of the container formed by it. This negative form is equipped with many suction holes, by means of which the mats can be pressed against the form saturated and without trapped air due to the depression. Thus an extremely light fuel-container can be produced, containing approximately 100 liters and fitting exactly into the construction. The tube bend 11 in the arch area laterally frontward is braced with two oblique struts 15, 16 toward the central horizontal tube 10. On its rear side, the tube bend 11 from its apex is braced with a fuselage strut 17 obliquely towards the upper side of the central tube 1. Therefore this tube bend 11 is also braced against a pitch around its fastening points with the square profile 12 and against torsion and thus it is extremely stable. Over its apex a transversally and horizontally extending tube 18 is arranged relative to the aeroplane longitudinal axis, which extends in the rear area inside the carrying wing 8 and which defines the rear wing edge. To this transverse tube 18 further tubes, that are not drawn here, are extended parallel towards this transverse tube 18 and linked in a swiveling way to this transverse tube 18. They proceed inside along the front edge of two drop shaped aluminium sheet profiles in the cross section that attach alongside one another. The external tubes at the wing operate as transversal rudder and the internal tube as a landing flap. The tensioning of the carrying wing 8 advantageously consists of an aluminium sheet, which is fixed along several wing profile elements not drawn here between the front transverse tube 7 and the back transverse tube 18 and which are fixed to the tube. As a variant can be used also a traction consisting of textile reinforced plastic-foil. The two ends of the carrying wing are equipped with plastic winglets, which provide for a current favourable detachment of the edge whirls and thus reducing the air drag of the carrying wing 8. The transverse tubes 7, 18, which define the front wing edge and rear wing edge, are each braced with a tube 19, 20 to the upper side of the external ends of the square profile 12. The main landing gear 21 consists of two shock strut tubes 22, 23, which run from the bottom leading obliquely angled and exactly fitted into the internal square profile 12 and being guided and fixed in it. The chassis, the cabin or cell and the motor cladding here are shown in dotted lines. They consist throughout of carbon fibre or fibreglass-composite structure or thin plastic-plates, precisely of several panels, possibly large panels, which are screwed with the chassis. It is clear that here only the really central elements of the whole chassis are drawn and described. Obviously, in the area of the fire wall further bracings are available, that however are already known the construction of the known C42. The motor mount 2 is braced several times backwards to the central tube 1 and presents at the points 24 each time a frontward directed thread sleeve, to which the motor can be screwed. For this aeroplane, for example, a piston engine will be used of the trademark ROTAX 914 with turbochargers that deliver on the test stand a maximum horsepower of 125. Through the special design of the chassis and the engine location 2 sufficient space remains behind the motor and in front of the fire wall, in order to accommodate a charge air cooler, which helps the engine to a power increase of up to 135 horsepower. This also is a substantial innovation because no former ultra light aeroplane offered sufficient space by construction conditions for the installation of an air cooler charger behind the engine and inside the motor Cowling. Apart from this, the motor mount 2 allows the installation of various motors, according to wishes and consumption. Special consideration can be given to installing a flight Diesel motor from Thielert as well as other more modern aircraft engine constructions, such as for example a Göbler-Hirth type 3701 three-cylinder two stroke engine with injection and 100 horsepower performance in case of a dead weight of only 45 kg.

The special, new and surprisingly aspect of the aeroplane presented here is that the cabin under observance of the conditions in relation to dry weight and maximum take-off weight nevertheless is spacious and formed in such a way and with such large doors that it becomes possible on the one hand to lay an adult patient on a stretcher into the cabin and on the other hand to block the stretcher there in a position, which remains inside the allowed load distribution, so that the gravity of the loaded aeroplane is not backwardly shifted too strongly. This is achieved since above the square profile 12, which is passes under the central tube 1, the level of a virtual bottom is defined, leaving a free space over the bottom, which shows at least a orthorhombic space with a length of 190 cm, a width of 45 cm and a height of 40 cm and thus it makes possible the accommodation of a patient lying on a stretcher.

In FIG. 2 the substantial elements are noted of the chassis construction of the aeroplane seen obliquely above. In this representation the situation of the introduction of a special stretcher 26 is indicated. At the back area of the central tube 1, that extends inside the body, laterally to the central tube 1 a rope capstan 51 with an electric engine and angle gear box is annexed, from which a rope leads outwards passing through a funnel shaped rearward widened opening, mounted at the tail of the aeroplane. The rope for winding up on the capstan serves for glider trailing. Due to the stable construction with a central tube 1, which extends up to the aeroplane stern, this type of rope capstan 51 can be accommodated inside the fuselage because the partly striking traction forces produced at the rear part or respectively in the rope mouth installed there, sometimes oblique-angled working towards the central tube 1, can be absorbed by said forced without problems.

Such a complete electric rope capstan with a weight of only 10 kg is offered by the Airla Flugzeug Service AG in CH-3368 Bleienbach and it is pre-eminently suitable for allowing gliding trailing with this light aeroplane. Since the rope is electrically retractable after the release of the glider, the tractor aeroplane can immediately prepare for landing, without having to fly a rope release loop. Moreover, in front of the rope mouth a cutting blade is mounted which is operable from the pilot's seat by means of a ropeway, so that the pilot's seat can cut the rope in case of emergency.

FIG. 3 shows the same construction centrally seen from above obliquely rearwards. The situation of the used stretcher 26 is also drawn here. FIG. 4 shows the construction in the area of the square profile 12 in an enlarged representation, precisely looking obliquely in front of the side of the pilot's seat. The square profile 12 in the type shown here is equipped on its upper side with a circular segment recess 27, in which the central tube 1 is fitted into exactly, hereafter the square profile 12 is screwed by means of set up fixing elements 28 with the central tube 1. Likewise, the square profile 12 can be also be passed without a recess entirely under the central tube 1 and it can be screwed with accordingly formed fixing elements with the central tube 1.

On the front side 33 of the square profile 12 the mount for the pilot's seat is recognised. For this purpose, two supporting rails 29 extend frontward from the front side 33 of the square profile 12, in which they are slightly bent upwards against the front side. These supporting rails 29, that can also be round in the cross section, are braced in its back area, each by means of a strut 30 obliquely downwards, also to the front side 33 of the square profile 12. The pilot's seat now consists of a line traced shell seat 31 of fibre-reinforced plastic which is designed according to ergonomic criteria and is guided and supported by means of a carriage on the two rails 29 in a displaceable way. The carriages can be attached to the rails 29 in different shifting positions by means of spring tensioned transverse pins that for this purpose have transversal borings 32. Thus, with the supporting rails 29 being inclined slightly upwards in a frontal direction, it is possible for the seat height in the case of moving the seat 31 to be lowered slightly backwards, so that a large pilot or passenger sits deeper than a small pilot or passenger who on the contrary will displace further forward the seat, by which the seat 31 is elevated relative to his/her height.

In FIG. 5 an aeroplane that is mainly the same is visible in a further construction stage. Here the right supporting wing 8 is already mounted, which is braced with the wing struts 19, 20 against the square profile 12. In the example shown here the square profile 12 is made without recess on its upper side completely under the central tube 1 and it is screwed by means of the fixing elements 28 to a non-positively engaged cross stable against torsion. The fuel tank 25 lies on the transverse struts 13 leading from the ends of the square profile 12 obliquely backward to the central tube 1. It presents a recess on its upper side, alongside which the central tube 1 extends, so that the tank lies symmetrically on the transverse struts 13 at both sides of the central tube 1 behind the square profile 12. Its upper side 43 lies approximately at the height of the central tube centre. In front the motor 35 mounted on the motor mount 2 is visible, with propeller flange 36, behind it the motor cover 44, under which the air cooler charger is located and after the motor mounting is found the instrument panel 41, through whose upper border proceeds the transverse strut 6 into the centre. In the area of the cabin a central support structure 42 is placed on the central tube 1, which covers the guiding control linkage and which is configured as an armrest and tray surface on its upper side. Behind this central support structure 42 the rodding 39, 40 is recognized for the actuation of the rudder flap. The tube bend 11 is set in and screwed with an arched border profile 34 with a U-shaped plastic cross-section. It is open against the backside, so that it is thus turned up from the front over the tube bend 11 and defines with its exterior the exterior of the cabin outside with its outside 45. On the other hand its front side 46 defines the rear side of the doorway that means the backside, the internal side of the doorframe. The line-traced door 47 above is abutted and supported by means of a gas compression spring 48 at the front side 46 of the arch profile 34.

In FIG. 6 this aeroplane is represented according to FIG. 5 with its main construction measures in centimeters and with the substantial angles relative to the position of the central tube 1 as well as the transverse struts mounted on them. It is noted that the central tube 1 against the front side is slightly downward inclined with an angle of approximately 5°. This aeroplane is dimensioned relative to its statics, so that it simultaneously fulfils both the future standard as well as the present standard (April 2003) the only ultra light aeroplane with a maximum take-off weight (Maximal Take-Off Weight MTOW) of 472.5 kg in the case of a dry weight of 297 kg in Europe as that with a MTOW of 590 kg in the case of a dry weight of 350 kg in the U.S.A. Since the aeroplane with a dry weight of 297 kg in the U.S.A. still has many weight reserves, that means in total allows an additional load of 293 kg, the construction of a version with floats or a combination of floats with landing gear is possible without problems. A float approximately contributes 40 kg to the take-off weight and therefore still remain approximately 250 kg as additional load capacity, which offer many application facilities that were hitherto reserved to an aeroplane of the sport plan Category.

In FIG. 7, a special stretcher 26 is represented in the layout, showing how it is applied to loading and fixing of a patient in a lying position to be transported in this light aeroplane. In order to create space for loading, the stretcher 26 in the approximately 90 cm long leg area 53 is smaller as in the approximately 100 cm long torso area of the patients to be transported. The stretcher 26 in its overall length measures approximately 190 cm and in the torso area 54, it is approximately 45 cm wide and in the leg area approximately 30 cm wide. On its lateral zones it presents a number of handle holes 51 that can also serve to be fixed on the stretcher 26 in the aeroplane, in which the stretcher with these holes 51 is invertible over semicircular mounts 52 supported on the chassis in the aeroplane. Such a mount 52 is shown beside the stretcher 26.

FIG. 8 shows how this special stretcher 26 with a patient lying on it can be loaded into the aeroplane. First the stretcher 26 at an angle of around 30° to 45° toward the aeroplane longitudinal axis is pushed with the leg area ahead of the aeroplane nose into the internal cabin, until its end impact against the central tube 1. Then the stretcher 26 with its head side end is swiveled against the aeroplane longitudinal axis until finally it can be turned parallel to the central tube 1 beside said tube on the mounts provided and until it can be inverted over the said tube.

FIG. 9 shows the complete aeroplane with the right side door 47 also opened. The gas compression spring 48 lifts the door 47 upward so that it can be closed and opened with little exertion and in the opened state, as we can see, it releases completely the doorway. The doorway above measures 100 cm in width, behind the doorway is 87 cm high, at the bottom it is 95 cm wide and at the largest point it is 120 cm wide. This doorway thus allows at the height of its largest width the introduction and retraction of a stretcher 26 as shown in FIG. 7. The lower front edge 49 of the doorway is situated approximately at the height of the centre of the central tube 1 extending behind it, and the foremost edge 50 of the doorway is situated roughly 20 cm above the upper vertex of the central tube 1 extending behind it. The cabin measures on the height of the largest point of the doorway in the layout front at least 115 cm in width, behind 127 cm in width and 120 cm long. In the representation shown here a patient in a lying position on a stretcher 26 is shown lying in the aeroplane. The head of the patient is situated behind the instrument panel and overlap of the hands of the pilot sitting on the other side. FIG. 10 shows the aeroplane seen from the left side with closed doors.

DIRECTORY

1 Central tube
2 Motor mount
3 Laterally perforated square profiled tube for front shock strut
4 Wheel fork at the shock strut
5 Front wheel
6 Central aluminium tube through instruments panel
7 Transverse tube for wing front edge
8 Supporting wings
9 Mouth point of the transverse struts 6 and 7
10 Apex tube in the cabin interior
11 Obliquely backward inclined tube bend
12 Square profile transversely beneath the central tube 12
13 Rear cross-member of the square profiled element 12
14 Front cross-member of the square profiled element 12
15 Diagonal struts on the right side of tube bends 11 at apex tube
16 Diagonal strut at the left side of tube bends 11 at apex tube
17 Fuselage struts
18 Transverse tube for wing trailing edge
19 Rear wing strut
20 Front wing strut
21 Main landing gear
22 Shock strut tube on the right
23 Shock strut tube on the left side
24 Fixed points the motor mount (thread sleeves)
25 Fuel tank
26 Stretcher
27 Circular segment form at square profiled element 12
28 Fixing elements for square profile 12
29 Supporting rails for seat
30 Transverse struts for rail 29
31 Shell seat
32 Transversal boring in the supporting rail
33 Front side of the square profile element 12
34 Arch profile for border tube bends 11
35 Engine
36 Propeller flange
37 Landing flaps
38 Ailerons
39 Elevator bar
40 Elevator bar
41 Instruments panel
42 Central support structure
43 Upper side tank
44 Engine cover
45 Exterior arch profile
46 Against the front pointed side of the arch profile
47 Door
48 Gas compression spring
49 Front lower edge of the door way
50 Foremost edge of the door way
51 Handle holes in bier 52 Mounts for stretcher
53 Leg area of the stretcher
54 Torso area of the stretcher

The invention claimed is:

1. A light aeroplane of the ultra light class and sport plane category, the aeroplane comprising:
   an engine attached to a motor mount, proximate a nose of the aeroplane, with a tractor propeller;
   a cabin cell, arranged behind the engine, wide enough for two adjacent passenger seats;
   a monolithic central tube, having at least a 200 mm diameter, attached to the motor mount and extending forward along a longitudinal axis toward an engine of the aeroplane and extending rearward along the longitudinal axis to at least behind a leading edge of a vertical stabilizer and elevator of the aeroplane;
   a square profiled tube engaged with and beneath the central tube, the square profiled tube being perpendicular to the central tube;
   shock strut tubes, for supporting main wheels of the aeroplane, fit into and fixed in the square profiled tube;
   an upward rising tube bend, behind and fixed with back side ends of the square profiled tube, bordered from the front side by a plastic U-shaped profile in a cross section and defining a back door frame and a local external outline of the cabin above the square profiled tube; and
   the cabin being limited on a lower side by a virtual flat cabin floor and limited on an upper side by the upward rising tube bend, the cabin further extending longitudinally behind the square profile, in which a volume above the virtual flat cabin floor presents an orthorhombic space of at least 190 cm in length, at least 45 cm in width, and at least 40 cm in height and is capable of receiving a person lying on a stretcher, a maximum take-off weight (MTOW) of the aeroplane being between 452.5 kg and 590 kg.

2. The light aeroplane of the ultra light class and sport plane category according to claim 1, wherein the tube bend is obliquely backward inclined and extends along an inner cabin cell wall, a door being fixed laterally above with its back edge adjacent to the tube bend,
   the door having an edge profile that is at least 100 cm wide, at a vertical location of the upper side of the central tube is at least 120 cm wide, and at a vertical location of the lower side of the central tube is at least 95 cm wide, so that a stretcher with a length of 190 cm can slide into a final position in the cabin.

3. The light aeroplane of the ultra light class and sport plane category according to claim 1, wherein the square profile has a lower side at lateral end zones, and the square profile is braced to the struts guided obliquely to the rear side at the central tube.

4. The light aeroplane of the ultra light class and sport plane category according to claim 1, further including a fuel tank,
   the fuel tank arranged behind the square profile,
   a width of the tank extending beyond the length of the square profile element,
   comprising a recess on its upper side, in the area of the central tube, in order to house the tube, and
   recesses in the fuel tank bottom leading from the lower side of the square profile obliquely to the rear side to the central tube.

5. The light aeroplane of the ultra light class and sport plane category according to claim 4, wherein the fuel tank is a container comprised of warm deformed carbon fibre reinforced plastic having a capacity of at least 80 to 120 liters.

6. The light aeroplane of the ultra light class and sport plane category according to claim 1, wherein two frontward pointed supporting rails, parallel to each other, extend from the front side of the square profiled tube, the rails being braced by oblique struts extending downward to the front side of the square profiled tube, and on said supporting rails a seat is guided into several positions by a carriage.

7. The light aeroplane of the ultra light class and sport plane category according to claim 1, further including an electrical rope capstan with an electric motor and angle gear box arranged behind the square profiled tube, at the central tube, for retracting rope of a rope way for drawing gliders.

8. The light aeroplane of the ultra light class and sport plane category according to claim 1, wherein the engine mount has a welded tube construction with four thread sleeves directed substantially parallel to each other and frontward, the sleeves defining the edges of a trapezium and secured to the engine which sits over the front end zone of the central tube, and wherein a charge air cooler is arranged behind the motor mount.

9. The light aeroplane of the ultra light class and sport plane category according to claim 1, wherein the aeroplane is designed for towing a glider, a tank being mounted on the opposite side of the pilot's seat of the central tube.

* * * * *